Feb. 13, 1962 W. H. MEEKER 3,020,612
SAFETY BELT BUCKLE AND INERTIA RESISTER
Filed Jan. 16, 1956
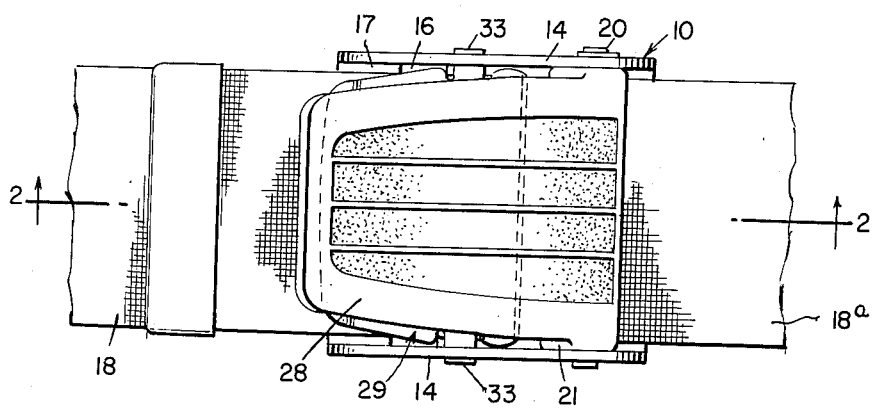
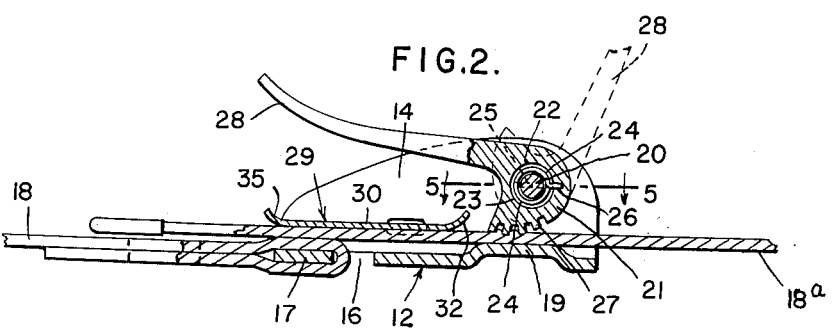
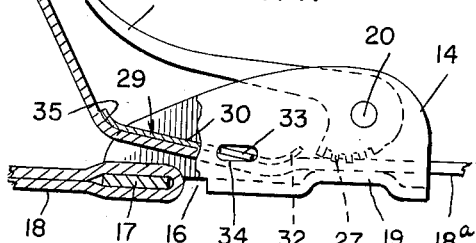
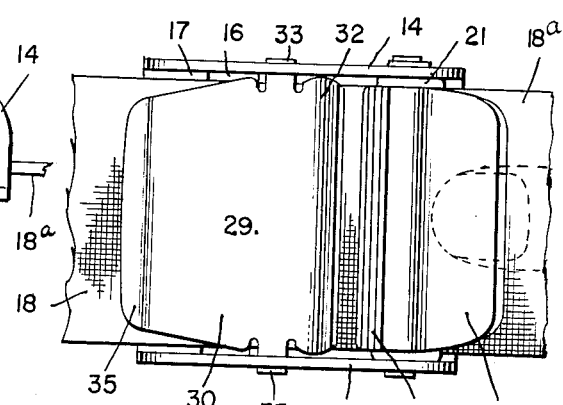
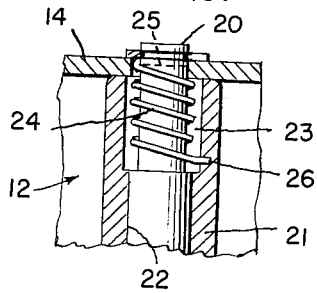
INVENTOR.
William H. Meeker
BY
Shoemaker & Mattare
ATTYS

United States Patent Office 3,020,612
Patented Feb. 13, 1962

3,020,612
SAFETY BELT BUCKLE AND INERTIA RESISTER
William H. Meeker, Rochester, N.Y., assignor to Hickok Manufacturing Co., Inc., Rochester, N.Y., a corporation of New York
Filed Jan. 16, 1956, Ser. No. 559,238
1 Claim. (Cl. 24—170)

This invention relates generally to the class of belt buckles and is directed more particularly to buckles of the type designed for use in connection with safety belts such as are being used in motor vehicles, airplanes and the like.

The use of safety belts in motor vehicles is rapidly coming into favor for holding passengers in the seats or preventing them from being thrown forward in the event of a crash or in the event that the vehicle turns over either as a result of a crash or for any other reason. When a head-on collision occurs or when a vehicle is turned over or otherwise violently checked in its forward movement and safety belts are employed in the vehicle for holding the passengers on their seats or checking their forward movement, such belts and the buckles holding the ends of the belts around the body of the passenger are subjected to a tremendous strain which it has been calculated may amount to anywhere from 19 to 40 times gravity.

The majority of buckles at present employed in connection with safety belts are of a type wherein one free end of a two-part belt is secured to the buckle by a friction grip means. Under maximum strain it has been known that such gripping means of the belt buckle may slip to some extent but only when the strain is of a high degree. However, it has been observed that under some conditions where such a high strain has not been imposed upon the belt and buckle, the buckle has nevertheless come open and released the person about whom the safety belt has been engaged. Investigation of this condition with a view to determining why the buckle may have come open, has indicated that where the buckle was provided with a conventional lever designed to be grasped to release the strap, if there was any amount of loose strap end, this loose end would be projected forwardly by inertia and pressed outwardly against the releasing lever and thus imposed a sufficient force thereagainst to oscillate the same and either completely release the buckle from the engaged end of the strap or lighten the grip to such an extent that when strain was applied to the strap by the body of the passenger or occupant of the seat about whom the strap passed, the strap would slip and the passenger would be released. Further investigation showed that the amount of load imposed upon the strap causing it to slip had a definite relationship to the amount of free end of the strap or belt webbing which existed to be projected forwardly under inertia and it was also observed that this action of the free end of the belt webbing occurred more readily to release the belt buckle if the person about whom the belt was engaged did not have the belt drawn tightly.

In view of the foregoing, it is an object of the present invention to provide an improved safety belt buckle which functions by friction to secure a free end of a safety belt with means for restraining or resisting the forward throw or movement of the free end of the belt webbing under inertia and thereby preventing the belt end from acting upon the releasing lever of the buckle to open the same or cause it to disengage from and release the secured belt end.

Another object of the invention is to provide a safety belt buckle wherein the securing means is designed to be easily and quickly actuated by the wearer of the belt, by the employment of one hand only, when it becomes necessary to release the buckle and wherein the buckle embodies a restrainer guard element lying under the releasing lever to prevent the free end of the engaged part of the safety belt from flying forward or being projected forwardly and striking the lever to cause the same to be shifted to buckle releasing position or at least to a position where the held end of the strap might slip when strain or load is imposed thereon.

A still further object of the invention is to provide a friction type safety belt buckle having an inertia resister or restrainer associated therewith for the purpose hereinbefore stated, which is so designed that it will not in any way interfere with the easy insertion of the free end of a safety belt into the buckle in the desired position where it will be frictionally held by the gripping element forming a part of the buckle.

Other objects and advantages of the invention will become apparent as the description of the same proceeds and the invention will be best understood from a consideration of the following detail description taken in connection with the accompanying drawing forming a part of the specification, with the understanding, however, that the invention is not confined to a strict conformity with the showing of the drawing but may be changed or modified so long as such changes or modifications mark no material departure from the salient features of the invention as expressed in the appended claim.

In the drawing:

FIG. 1 is a view in plant or a front elevation of a safety belt buckle constructed in accordance with the preferred embodiment of the present invention and showing a free end portion of one section of a safety belt in secured position therein;

FIG. 2 is a longitudinal sectional view taken substantially on the line 2—2 of FIG. 1 and in which view the actuating lever for the gripping means together with the gripping means is shown in dotted outline in open position;

FIG. 3 is a view in plan or front elevation corresponding to FIG. 1 but showing the operating lever in fully opened position where the free end of one section of the safety belt may be released or may be freely inserted into the buckle beneath the inertia resister or restrainer which is shown in plan;

FIG. 4 is a view partly in side elevation and partly in section of the buckle illustrating the manner in which an inertia resister or restrainer protects the operating lever against opening thrust by and upon the forward projection of the free end portion of the belt webbing;

FIG. 5 is a detail section taken substantially on the line 5—5 of FIG. 2.

Referring now more particularly to the drawing, the body of the present improved buckle structure is generally designated 10 and is illustrated as comprising a bottom or back plate 12 of desired length. Opposite longitudinal sides of the plate 12 are defined by the outstanding side walls or flanges 14 which may be formed as an integral part with the plate 12 in any suitable manner, preferably by pressing the plate to turn up the side flanges so that the body may be produced in one operation from a single piece of metal.

While the edge contour of the flanges 14 may be as desired, such flanges are shown as having a maximum height at the end of the buckle which would be at the right side of the wearer of the belt and gradually decreasing height toward the opposite or left hand side. However, it is to be understood that this form for the side flanges is not restricting in any manner as the flanges may be of equal height from one end to the other or of any other outline as may be desired.

Adjacent to the end of the buckle which has been referred to as the left hand end, the body plate is provided with a transverse slot 16 thus providing a portion 17 in the nature of a bar around which an end of one portion of a safety belt may be engaged, the end being passed through the slot and turned back upon itself to be secured to the body so as to form a permanent attachment for this portion of the safety strap which is generally designated 18.

Adjacent to the opposite end of the buckle which end has heretofore been referred to as the right hand end, considering the buckle as shown in the several figures of the drawing and as it would probably be worn for use by a right handed person, the back plate has a portion pressed forwardly to provide a slightly elevated platform 19 which coacts as hereinafter described with the gripping means for securing a free end portion of another section of the safety belt which is designated 18$^a$.

Disposed to extend across the outer or forward face of the elevated or platform portion 19 between the side flanges 14 is a pivot pin 20. This pin is elevated from the platform 19 or positioned outwardly therefrom as clearly shown in FIG. 2.

The numeral 21 designates a gripping jaw which is in the form of a substantially circular or cylindrical bar having formed longitudinally therethrough the eccentric passage 22 through which the pivot pin 20 passes. This pivot pin is of an overall diameter throughout the major portion of its length to fit snugly in the passage 22 but at one end it is provided with an encircling recess 23 in which is positioned a coil spring 24 which surrounds the shaft in the reduced area and has one end turned to extend transversely of the shaft into a suitable aperture 25 while the opposite end turns outwardly and is fixed in the gripping member or body 21 as indicated at 26. The eccentric mounting of the body 21 provides a peripheral area which extends outwardly to form a camming or gripping surface 27 which is preferably serrated or toothed longitudinally of the body 21 as is clearly shown in FIGS. 2 and 3, and when the gripping body is turned in the buckle-closed position, this toothed surface is disposed in relatively close relation with the surface of the platform portion 19 to grip the free end of the strap or belt 18$^a$ when the latter is extended longitudinally through the buckle between the gripping body and the supporting platform 19.

The numeral 28 generally designates a levering tongue which is carried by the gripping body 21 and is preferably formed as an integral part thereof. This tongue in the closed position of the buckle extends longitudinally of the buckle toward the left hand end or toward that end to which the strap portion 18 is fixed and when it is in this position where it extends longitudinally of the buckle body the serrated gripping surface of the body 21 will be in a belt holding or securing position.

The numeral 29 generally designates the inertia resister or restrainer. This unit is in the form of a relatively thin plate body 30 which, as shown in FIG. 3, has a maximum width approximately equal to the width of the space between the flanges 14. The restrainer 29 is located at the left hand side of the gripping body 21 or in a position where it will lie between the lever tongue 28 when the buckle is in closed position and the plate 12 or between the tongue and the inserted and secured end of the portion 18$^a$ of the belt. The end of the inertia restrainer plate body 20 nearest to the gripper 21 is curved outwardly slightly as indicated at 32 and adjacent to this curved portion 32 the body 30 carries the outwardly extending flat fulcrum ears 33 each of which extends into and through a slot 34 formed in or through the adjacent flange 14.

It will be seen upon reference to FIG. 3 that the major portion of the restrainer body 30 lies to the left of the fulcrum ears 33 and the width of the plate body is preferably gradually reduced slightly toward this left or outer end and such outer end is also curved or turned upwardly slightly as indicated at 35.

The slots or openings 34 in which the flat fulcrum ears lie are of a width greater than the thickness of the ears 33 engaged therein. This permits a limited rocking movement of the plate body 30 as illustrated in FIG. 4.

It will also be seen upon reference to FIG. 2 that the elevation of the body 30 above the plate 12 of the buckle body is such that the under or rear side of the plate 30 will be approximately in line with the serrated or toothed portion of the gripper 21 when the latter is in belt holding position. Also the inpressed platform portion 19 of the plate 12 has its top or forward surface elevated above the top or forward surface of the adjacent part of the plate 12 an amount approximately equal to the thickness of the belt web. Thus when the free end of the belt portion 18$^a$ is inserted between the gripper 21 and the platform 19 it will extend straight across the underside of the plate 30 and over the looped part of the belt portion 18 which is engaged around the bar 17. Thus when the gripper 21 is rotated to lever opened position, the free end of the belt portion 18$^a$ can be inserted and drawn through the buckle without difficulty or without being obstructed by any of the parts.

As hereinbefore stated, investigation has shown that when a buckle of the character herein disclosed is in use and no means is provided such as the restrainer unit 29 for preventing the free end of the belt portion 18$^a$ from flying forwardly under inertia, this forwardly flying end portion will strike the inner or under side of the lever 28 and tend to release the body from its gripping hold on the inserted portion 18$^a$ of the belt. This action occurs more readily where the wearer of the belt may not have drawn the belt tight about his body. It has also been found that different free end lengths of the belt webbing imposed different amounts of strain when the belt is in use and when a crash occurs which causes such free end of the belt to be projected forwardly by inertia. For example, in a situation where there is no free end to the engaged portion 18$^a$ of the web to fly forwardly, as where the end of the webbing is secured to the other portion 18 or in some other manner held against forward movement, a force of anywhere from 19 to 40 times gravity may be required to bring about a slipping of the attached webbing portion 18$^a$. Where approximately 5 inches of free webbing is present, a force of anywhere from 6 to 14 times gravity will effect the opening of the buckle where the free end of the webbing is not restrained but can strike the end of the buckle lever 28.

If about 10 inches of webbing is free to fly forward, the amount of strain on the belt necessary to cause it to slip when the end of the webbing strikes the lever is reduced to from 4 to 9 times gravity and where there may be approximately 15 inches of free webbing to be projected forwardly under inertia against the buckle lever, a strain of only from 2 to 6 times gravity is required to cause the belt to slip and allow the passenger to be thrown from his seat.

By the provision of the herein illustrated and described inertia resister or restrainer, any free end of the belt which may be projected forwardly by inertia in a crash will be checked by the plate body 30 and prevented from striking the releasing lever 28 in the manner illustrated in FIG. 4 and thus the accidental opening of the buckle or slipping of the belt will not result.

Of course it is apparent that the free end of the belt will be carried forwardly to a degree according to the initial speed and deceleration involved. The free end of the belt may be carried forwardly to such an extent that it engages the outermost end portion of tongue 28. This action will not release the mechanism such that the buckle will open, since the major undersurface of the tongue is protected from impact by the free end of the belt, and the free end of the belt will pivot about portion 35 of the restrainer unit 29 such that its force is applied substantially parallel with the longitudinal dimension of tongue 28 producing an insignificant amount of force tending to release the buckle. The restrainer unit will absorb the major portion of the force acting on the free end of the belt in a direction forwardly of the unit which would tend to release the buckle. It is accordingly evident that the free end of the belt is prevented from striking the releasing lever 28 with any substantial force which would release the lever, and accordingly, the inertia resistor prevents accidental release of the buckle in a crash or similar situation.

I claim:

A safety belt buckle comprising a body having a base and elongate spaced side flanges, means for attaching a belt to one end portion of the base, means rockably supported by and between the flanges adjacent to the other end of the body for gripping an end portion of a belt, an elongate lever tongue connected to said means for actuating the same to belt releasing position and extending toward said one end of the base when said means is in belt gripping position, a plate member disposed between said flanges between the lever tongue and the body base, and means supporting said plate in spaced relation to said body base comprising outwardly extending flat trunnion ears carried upon opposite sides of said plate adjacent to the end thereof nearest to said gripping means and slots in said flanges in which said trunnion ears are loosely mounted for limited turning movement, said loose mounting of the trunnion ears in the slots permitting limited swinging of the other end of the plate and preventing engagement of said plate with said lever tongue.

References Cited in the file of this patent

UNITED STATES PATENTS

| | | |
|---|---|---|
| 307,345 | Smith | Oct. 28, 1884 |
| 332,425 | Osborne | Dec. 15, 1885 |
| 676,198 | Malloy | June 11, 1901 |
| 2,060,628 | McCormick | Nov. 10, 1936 |
| 2,442,266 | Davis | May 25, 1948 |
| 2,496,891 | Preszler | Feb. 7, 1950 |

FOREIGN PATENTS

| | | |
|---|---|---|
| 825,126 | Germany | Dec. 17, 1951 |
| 1,791 | Great Britain | 1874 |
| 13,134 | Great Britain | 1909 |